United States Patent
Barcelo et al.

(10) Patent No.: US 11,213,791 B2
(45) Date of Patent: Jan. 4, 2022

(54) NANO WIRE MICROPOROUS STRUCTURE

(71) Applicant: Hewlett-Packard Development Company, L.P., Houston, TX (US)

(72) Inventors: Steven Barcelo, Palo Alto, CA (US); Ning Ge, Palo Alto, CA (US); Anita Rogacs, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 479 days.

(21) Appl. No.: 15/763,064

(22) PCT Filed: Oct. 22, 2015

(86) PCT No.: PCT/US2015/057072
§ 371 (c)(1),
(2) Date: Mar. 23, 2018

(87) PCT Pub. No.: WO2017/069770
PCT Pub. Date: Apr. 27, 2017

(65) Prior Publication Data
US 2018/0272284 A1    Sep. 27, 2018

(51) Int. Cl.
*B01D 63/00*    (2006.01)
*B01D 69/10*    (2006.01)
(Continued)

(52) U.S. Cl.
CPC ....... *B01D 63/088* (2013.01); *B01D 39/1692* (2013.01); *B01D 61/38* (2013.01);
(Continued)

(58) Field of Classification Search
CPC .............. B01D 63/088; B01D 39/1692; B01D 67/0002; B01D 67/0088; B01D 63/005; B01D 61/38; B01D 69/04; B01D 67/0034; B01D 67/0072; B01D 67/0069; B01D 2325/028; B01D 67/0004; B01D 67/0037;
(Continued)

(56) References Cited

U.S. PATENT DOCUMENTS 5,079,272 A * 1/1992 Allegrezza, Jr. ... B01D 67/0006
521/134
5,603,953 A    2/1997 Herbig et al.
(Continued)

FOREIGN PATENT DOCUMENTS

CN    101568367    10/2009
CN    102017241    4/2011
(Continued)

OTHER PUBLICATIONS

Fang, David Z. et al., Pore Size Control of Ultrathin Silicon Membranes by Rapod Thermal Carbonization, Nano Letters, Sep. 14, 2010, pp. 3904-3908, vol. 10, No. 10, American Chemical Society.
(Continued)

*Primary Examiner* — Walter D. Griffin
*Assistant Examiner* — Angel Olivera
(74) *Attorney, Agent, or Firm* — Tong Rea Bentley & Kim LLC

(57) ABSTRACT

A microporous structure includes an array of nano wires and a coating about the nano wires of the array. The coating defines pores between the nano wires.

15 Claims, 10 Drawing Sheets

(51) Int. Cl.
*B01D 39/16* (2006.01)
*B01D 61/38* (2006.01)
*B01D 63/08* (2006.01)
*B01D 67/00* (2006.01)
*B01L 3/00* (2006.01)
*B01D 69/04* (2006.01)
*B01D 69/14* (2006.01)

(52) U.S. Cl.
CPC ....... *B01D 63/005* (2013.01); *B01D 67/0002* (2013.01); *B01D 67/0079* (2013.01); *B01D 67/0088* (2013.01); *B01D 69/10* (2013.01); *B01L 3/502715* (2013.01); *B01D 67/0004* (2013.01); *B01D 67/0034* (2013.01); *B01D 67/0037* (2013.01); *B01D 67/0041* (2013.01); *B01D 67/0069* (2013.01); *B01D 67/0072* (2013.01); *B01D 69/04* (2013.01); *B01D 69/148* (2013.01); *B01D 2325/028* (2013.01); *B01L 2200/027* (2013.01); *B01L 2300/0681* (2013.01)

(58) Field of Classification Search
CPC .... B01D 69/148; B01D 71/022; B01D 69/10; B01D 67/0079; B01D 67/0041; B01D 67/0062; B01D 2325/021; B01D 71/027; B01D 15/34; B01L 3/502715; B01L 2200/027; B01L 2300/0681; B01L 2300/0816; B01L 2200/0652; B01L 2400/0406; B01L 3/5027; B01L 2300/0861; B01L 2300/0883; B01L 2300/0887; B01L 2300/0896; B01L 2300/161; B01L 2300/08; B01L 2300/16; G01N 15/1056; Y10T 29/49982; B33Y 80/00; B33Y 70/00; B82Y 30/00; B81B 2201/058
See application file for complete search history.

(56) References Cited

U.S. PATENT DOCUMENTS

| 5,753,014 | A | * | 5/1998 | Van Rijn | B01D 67/0072 |
| | | | | | 96/12 |
| 6,291,705 | B1 | * | 9/2001 | Ho | B01D 61/246 |
| | | | | | 562/9 |
| 7,309,385 | B2 | | 12/2007 | Hong et al. | |
| 7,611,628 | B1 | | 11/2009 | Hinds, III | |
| 2003/0205552 | A1 | | 11/2003 | Hansford et al. | |
| 2003/0209314 | A1 | * | 11/2003 | Guo | B01L 3/502707 |
| | | | | | 156/247 |
| 2005/0242035 | A1 | | 11/2005 | Cobbe et al. | |
| 2007/0190880 | A1 | | 8/2007 | Dubrow | |
| 2009/0283475 | A1 | | 11/2009 | Hylton et al. | |
| 2010/0050866 | A1 | * | 3/2010 | Yu | B01D 39/12 |
| | | | | | 95/21 |
| 2010/0098992 | A1 | | 4/2010 | Morin et al. | |
| 2013/0108865 | A1 | * | 5/2013 | Boulanger | B01D 69/148 |
| | | | | | 428/340 |
| 2013/0228466 | A1 | | 9/2013 | Sun | |
| 2013/0270180 | A1 | | 10/2013 | Zhang et al. | |
| 2014/0302579 | A1 | | 10/2014 | Boulanger | |

FOREIGN PATENT DOCUMENTS

| CN | 102046274 | 5/2011 |
| CN | 102802770 | 11/2012 |
| CN | 103337449 | 10/2013 |
| CN | 104203293 | 12/2014 |
| EP | 1341655 | 9/2003 |
| WO | WO-2011117443 | 9/2011 |

OTHER PUBLICATIONS

Jia, Liu et al., Supported Liquid Membrane Extraction and Its Application in Food Safety Inspection, Dec. 3, 2009, pp. 29-33, vol. 31, No. 10.

Krull, F.F. et al., Liquid Membranes for Gas/vapor Separations, Journal of Membrane Science, Sep. 19, 2008, pp. 509-519, vol. 325, No. 2.

Gleason, Karen K., ed. "CVD Polymers: Fabrication of Organic Surfaces and Devices". pp. 281-284. John Wiley & Sons, 2015.

Kislik, Vladimir S., ed. "Liquid membranes: principles and applications in chemical separations and wastewater treatment". pp. 188-189 and 328-333, Elsevier, 2009.

Parhi, P. K. "Supported liquid membrane principle and its practices: A short review." Journal of Chemistry, vol. 2013, Article 618236, 11 pages (2013).

Hylton, Kamilah, et al. "Carbon nanotube mediated microscale membrane extraction." Journal of Chromatography A 1211.1 (2008): 43-48.

Zheng, Maojun, et al. "Fabrication and structural characterization of large-scale uniform SnO2 nanowire array embedded in anodic alumina membrane." Chemistry of materials 13(11), pp. 3859-3861 (Sep. 12, 2001).

Zhou, Qingxiang, et al. "Determination of atrazine and simazine in environmental water samples using multiwalled carbon nanotubes as the adsorbents for preconcentration prior to high performance liquid chromatography with diode array detector", Talanta, vol. 68, Issue 4, pp. 1309-1315 (Feb. 15, 2006).

* cited by examiner

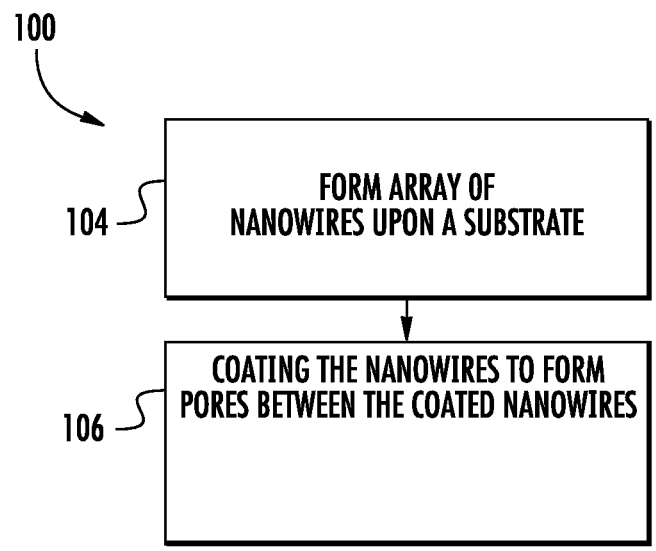

NANO WIRE MICROPOROUS STRUCTURE

BACKGROUND

Microporous structures are often used to form filters or membranes. The microporous structures provide multiple pores through which solutions may be filtered or through which ions may be exchanged.

BRIEF DESCRIPTION OF THE DRAWINGS

FIG. 4 is a flow diagram of an example method for forming an example microporous structure.

FIG. 5A is a flow diagram of another example method for forming an example microporous structure.

DETAILED DESCRIPTION OF EXAMPLES

Microporous structures are often used to form filters or membranes. The microporous structures provide multiple pores through which solutions are filtered or through which ions are exchanged. Controlling the size and density of the pores is often difficult, increasing fabrication complexity and cost.

Figure 1:
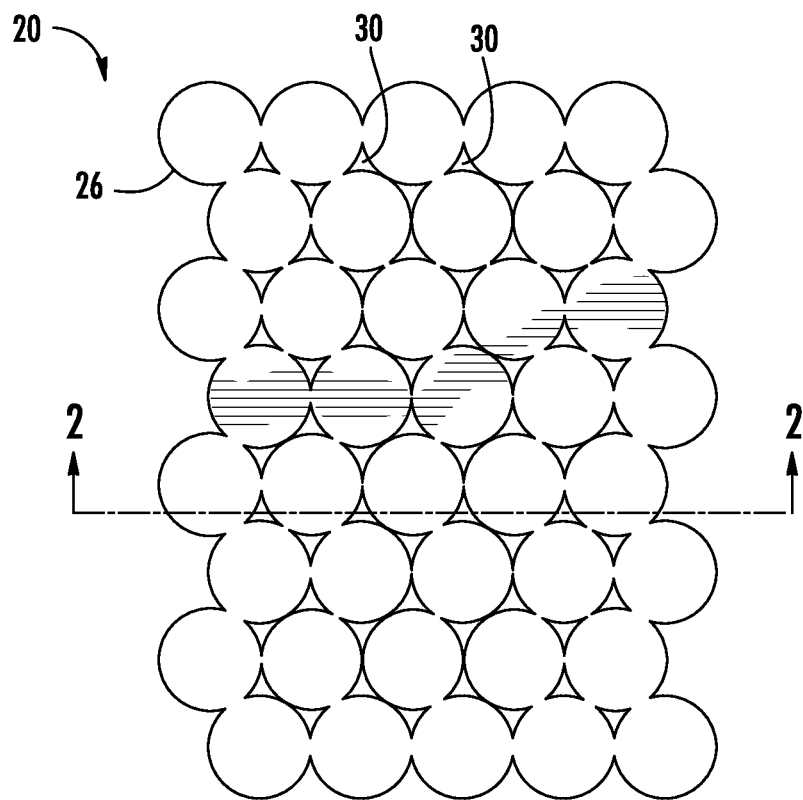
FIG. 1 is a top view of an example microporous structure.
Figure 2:
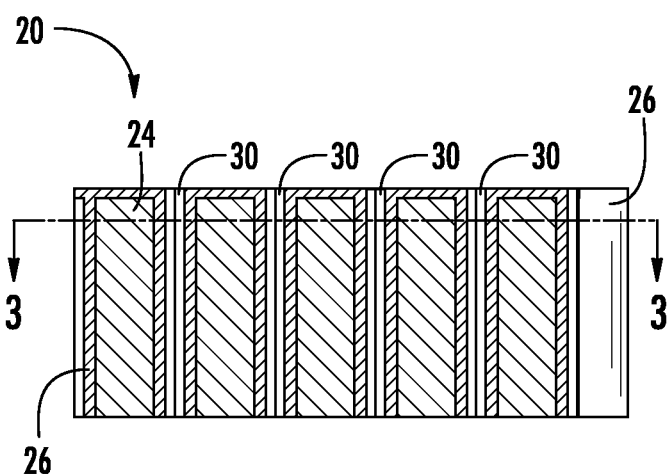
FIG. 2 is a sectional view of the example microporous structure of FIG. 1 taken along line 2-2.
Figure 3:
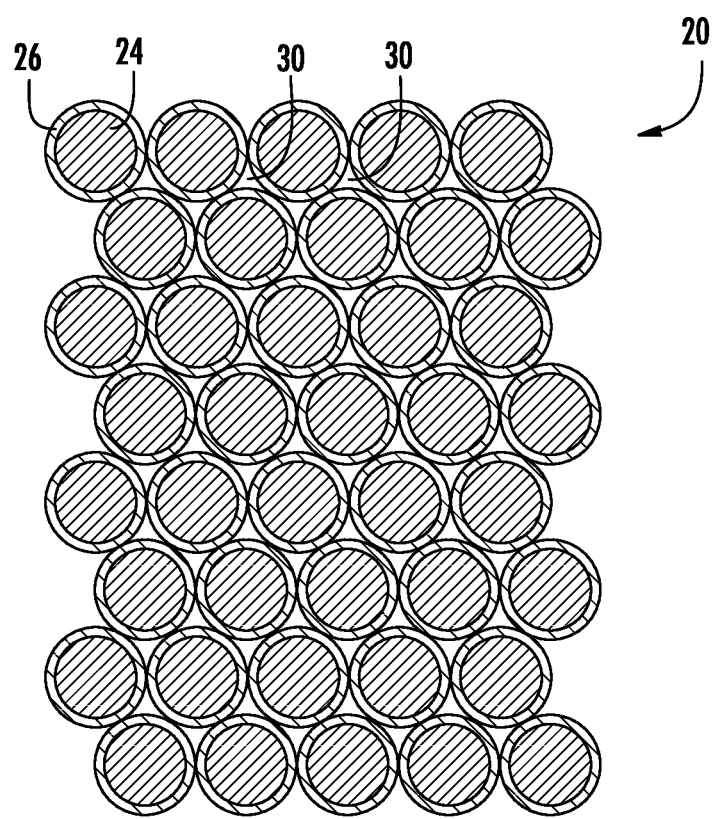
FIG. 3 is a sectional view of the example microporous structure of FIG. 2 taken along line 3-3.

FIGS. 1-3 illustrate an example microporous structure 20. Microporous structure 20 may serve as a filter or membrane. Microporous structure 20 comprises pores, the size and/or density of which is controlled or defined based upon the characteristics of coated nano wires. Because coated nano wires are used to control the size and/or density of the pores, microporous structure 20 may be provided with pores that are precisely tuned to satisfy particular criteria of the filter or membrane that is to include the microporous structure.

Microporous structure 20 comprises nano wires 24 and coating 26. Nano wires 24 comprises a two dimensional array of nano wires which are joined are held together by coating 26. Nano wires 24 comprise columnar structures such as pillars, needles, or fingers. Such columnar structures have a nanometer scale. In one implementation, nano wires 24 are formed from silicon.

In one implementation, each of nano wires 24 has a diameter of at least 20 nm and less than 1 um. In one implementation, each of nano wires 24 has a height (forming a thickness of microporous structure 20) of at least 50 nm and less than or equal to 1000 nm. One implementation, nano wires 24 have a density of at least 10% and up to 99.99% or higher. In one implementation, each of voids 30 have a cross-sectional area of at least 5 nm and less than or equal to 1 um. In one implementation, the density of voids 30 across microporous structure 20 is at least 0.1% or lower to 90%.

Coating 26 comprises a layer or multiple layers of a material or multiple materials interconnecting and holding together nano wires 24. Coating 26 does not completely fill all voids or spaces between consecutive or adjacent nano wires 24, wherein the unfilled or remaining voids or spaces form pores 30 of microporous structure 20. The relative spacing of nano wires 24 and the degree to which coating 26 fills the intermediate voids controls the size of the pores 30 as well as their density and spacing. Pores 30 allow selected materials, components or analyte to pass therethrough by filtering or diffusion. In one implementation, pores 30 retain a liquid, such as organic solvent or organic phase, wherein microporous structure 20 is part of a supported liquid membrane.

In one implementation, coating 26 comprises a coating applied to at least portions of nano wires 24, wherein the coating on one of nano wires 24 contacts the coating on an adjacent nano wires 24 or directly contacts the adjacent nano wires 24 so as to connect and hold the two nano wires 24 in place relative to one another. In one implementation, coating 26 comprises a coating that is applied to at least portions of each of nano wires 24. In another implementation, coating 26 comprises a coating that is applied completely about the outer surfaces of each of nano wires 24, wherein the coating about a nano wire 24 contacts the coating about an adjacent nano wire. In the example illustrated, the coating about a nano wire 24 may contact the coating of multiple other adjacent nano wires 24. In one implementation, coating 24 comprises a polymer coating is coated upon nano wires 26. In other implementations, coating 26 may be grown around each of nano wires 24 by atomic layer deposition or chemical vapor deposition. In yet other implementations, the coating forming coating 26 may be formed in other fashions.

FIG. 4 is a flow diagram of an example method 100 for forming an example microporous structure, such as microporous structure 20. As indicated by block 104, an array of nano wires, such nano wires 24, is formed upon a substrate 40. In one implementation, nano wires 24 may be grown. For example, nano wire seeds may be deposited onto substrate 40, wherein columnar structures are grown through chemical vapor deposition from a material such as silane. In such an implementation, a seed layer may be patterned with a desired density, wherein the diameter of each nano wire, during such growth, is precisely controlled to achieve a desired pore size and density. The height of each nano wire 24 may be further control during the growth process to provide an appropriate or desired thickness for microporous structure 20. In some implementations, nano wires 24 may be formed by vapor-liquid-solid (VLS) or solution-liquid-solid (SLS) fabrication methods.

In another implementation, the nano wires 24 may be formed by etching the substrate. For example, in one implementation, a reactive ion etching process may be applied to a substrate, such as a silicon, producing flexible columns. The material removal from the silicon substrate may be achieved through the action of reactive gaseous species such as fluorine, chlorine, bromine or a halogen, in the presence of gaseous nitrogen, argon or oxygen. In yet another implementation, such columnar structures of nano wires 24 may be formed by nano imprinting, wherein a thin-film, such as a polymer capable of significant cross-linking under exposure to UV light, is applied to a substrate, in the form of a web to produce a coating on the web and wherein flexible columns in the form of nanopoles are produced by rolling the web between a pair of rolls, one of which is a die having a relief pattern that is impressed into the highly viscous thin film coating of the web leaving a negative of the relief pattern of the die in the form of a plurality of nano poles on the web. In yet another implementation, hot nano embossing of a coating, such as a polymer plastic, with a die having a relief pattern that is impressed into the polymer plastic that coats the substrate so as to leave a negative of the relief pattern of the die in the form of a plurality of nano poles on the substrate.

As indicated by block 106, the formed nano wires of the array are coated so as to form pores between the coated nano wires. In one implementation, coatings of adjacent nano wires contact and fuse one another to join the nano wires as a single unit. In another implementation, the coatings of adjacent nano wires do not contact one another, but are held in place relative to one another by the substrate upon which the nano wires were formed. In implementations where the substrate retains the coated nano wires in place relative to one another, during use of the formed microporous structure, analyte extraction or fluid filtering occurs in directions parallel to or along and across the surface of the substrate.

Figure 5B:
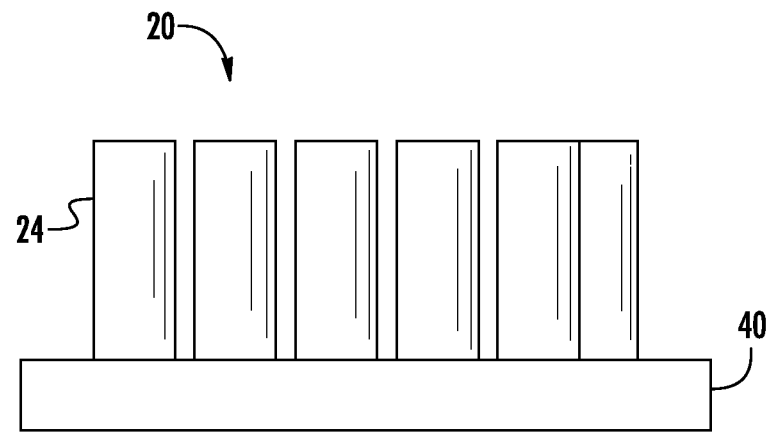
FIG. 5B is a side view of example nano wires formed upon an example substrate.
Figure 5C:
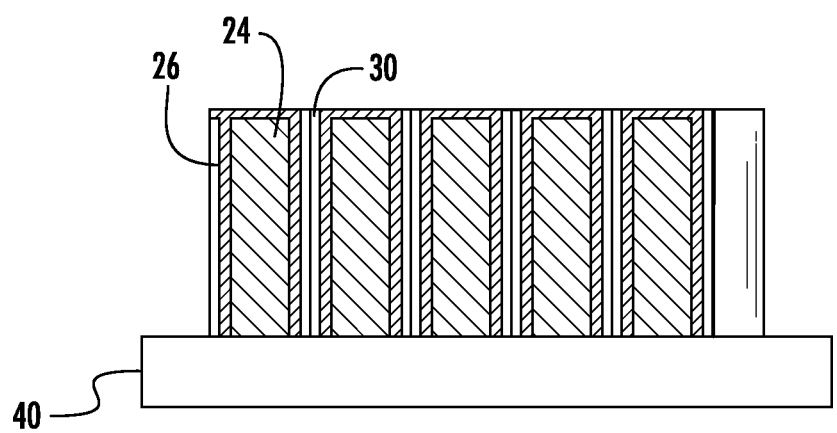
FIG. 5C is a side view of the example nano wires formed upon the example substrate after being coated to form an example coating between the nano wires.

In some implementations where the coating serve as binders joining the nano wires and retain the nano wires in place relative to one another, independent of the substrate upon which the nano wires were formed, the substrate may be removed, facilitating analyte extraction or fluid filtering in directions perpendicular to the major dimension of the microporous structure. FIGS. 5A, 5B and 5C illustrate one method for forming an example microporous structure, such as microporous structure 20, wherein the substrate used to form the nano wires is subsequently separated. FIG. 4 is a flow diagram of an example method 150 for forming a microporous structure, such as microporous structure 20 shown in FIGS. 1-3. As indicated by block 104 in FIG. 5A, and illustrated in FIG. 5B, an array of nano wires, such nano wires 24, is formed upon a substrate 40. As described above with respect to block 104 in FIG. 4, the array of nano wires upon the substrate may be formed in multiple fashions.

As indicated by block 156 in FIG. 5A and illustrated in FIG. 5C, the array of nano wires 24 are interconnected independent of the substrate 40 on substrate 40 to form the pores 30 (shown in FIG. 1) between interconnected nano wires 24. FIG. 5C is a sectional view taken along the same line as the completed microporous structure 20 shown in FIG. 2. In the example illustrated, the individual nano wires 24 of the array are interconnected by coating 26. In one implementation, coating 26 is formed by applying a coating of a material or multiple materials onto mutually facing surfaces of nano wires 24 such that the coatings of adjacent or consecutive nano wires 24 fuse or melt to one another to interconnect and retain the array together independent of substrate 40.

As indicated by block 158, once the coating has sufficiently solidified or cured, the interconnected array of nano wires 24 are separated from substrate 40 to form the microporous structure shown in FIGS. 1-3. In one implementation, the coating and the partially encapsulated nano wires 24 are peeled off of substrate 40 as a unit. In other implementations, the coating and the partially encapsulated nano wires 24 are severed from substrate 40.

Figure 6:
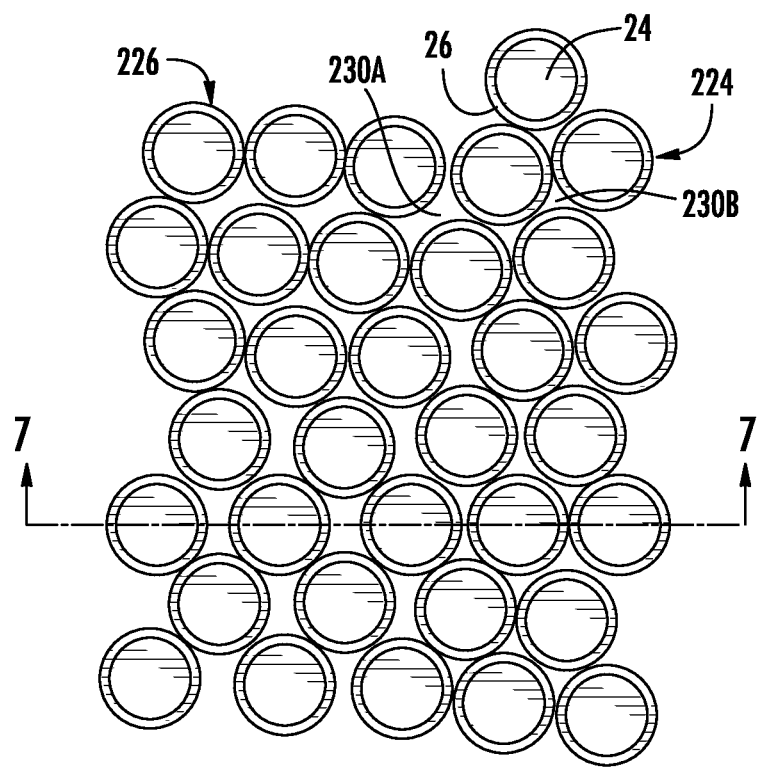
FIG. 6 is a sectional view of another example microporous structure.
Figure 7:
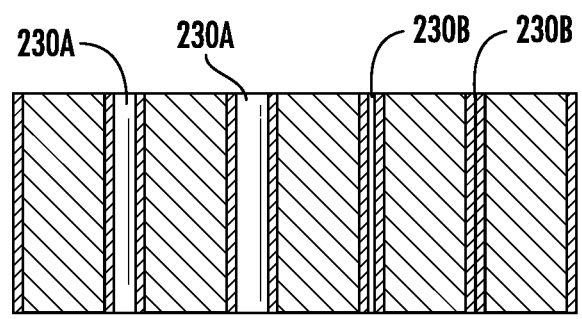
FIG. 7 is a sectional view of the example microporous structure of FIG. 6 taken along line 7-7.

FIGS. 6 and 7 are sectional views (similar to the views of FIGS. 2 and 3) through a microporous structure illustrating how the density and size of pores of a microstructure may be precisely controlled by varying the location and/or density of the nano wires. FIGS. 6 and 7 illustrate microporous structure 220, another implementation of microporous structure 20. Microporous structure 220 is similar microporous structure 20 except that nano wires 24 are formed with a different pattern and a different density in the two dimensional array. In the example illustrated, the density and spacing of nano wires 24 varies across the microporous structure 220 itself. In particular, microporous structure 220 has a first portion 224 with a first density of nano wires 24 and a second different portion 226 with a different, lesser density of nano wires 24. The spacing between nano wires 24 in the region or portion 226 is greater than the spacing between nano wires 24 in the region or portion 224. The different densities of nano wires 24 result in differently sized and differently spaced pores 230A, 230B (collectively referred to as force 230). The differently sized and differently spaced pores 230 facilitate different filtering functionality for microporous structure 220 as compared to microporous structure 20.

Figure 8:
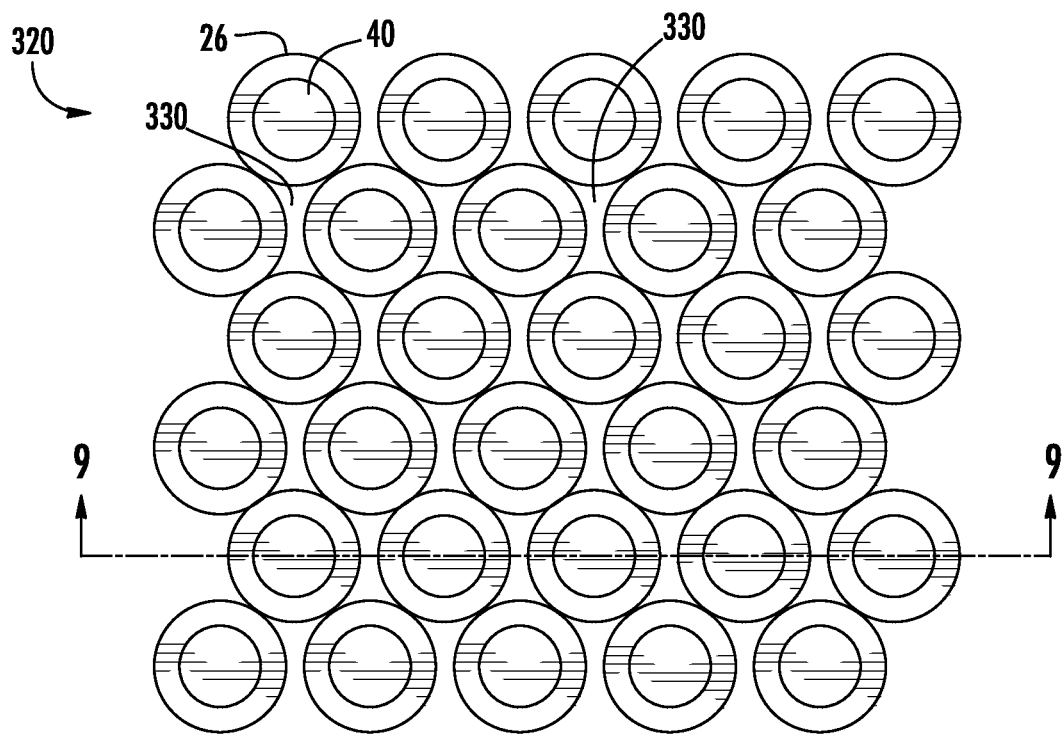
FIG. 8 is a sectional view of another example microporous structure.
Figure 9:
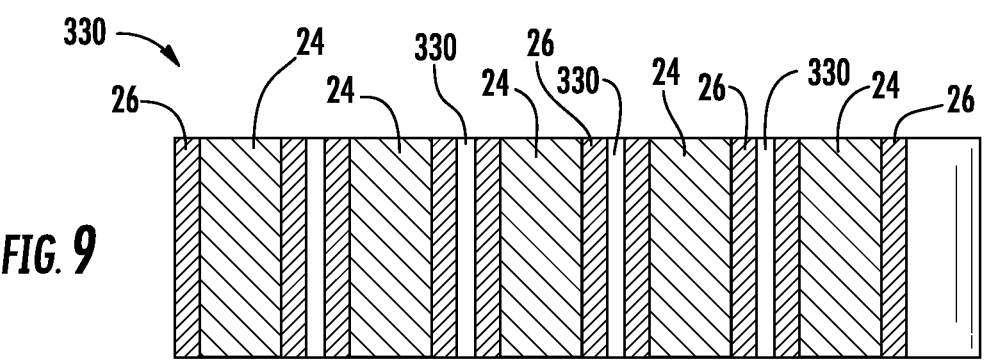
FIG. 9 is a sectional view of the example microporous structure of FIG. 8 taken along line 9-9.

FIGS. 8 and 9 are sectional views through microporous structure 320 illustrating how a thickness of the coating applied to or formed upon nano wires 24 may also be used to control the size, location, spacing and density of the pores of the microporous structure. FIGS. 8 and 9 illustrate another example microporous structure 320, another example of microporous structure 20. In the example shown in FIGS. 8 and 9, nano wires 24 are provided with a greater spacing therebetween, wherein each of nano wires 24 are coated with a coating having a greater thickness forming coating 26. A thickness about each of nano wires 24 is such that the coatings interconnect the different nano wires 24. Different coatings facilitate the formation of pores 330 differently sized and shaped as compared to pores 30 and 230 described above.

Figure 10:
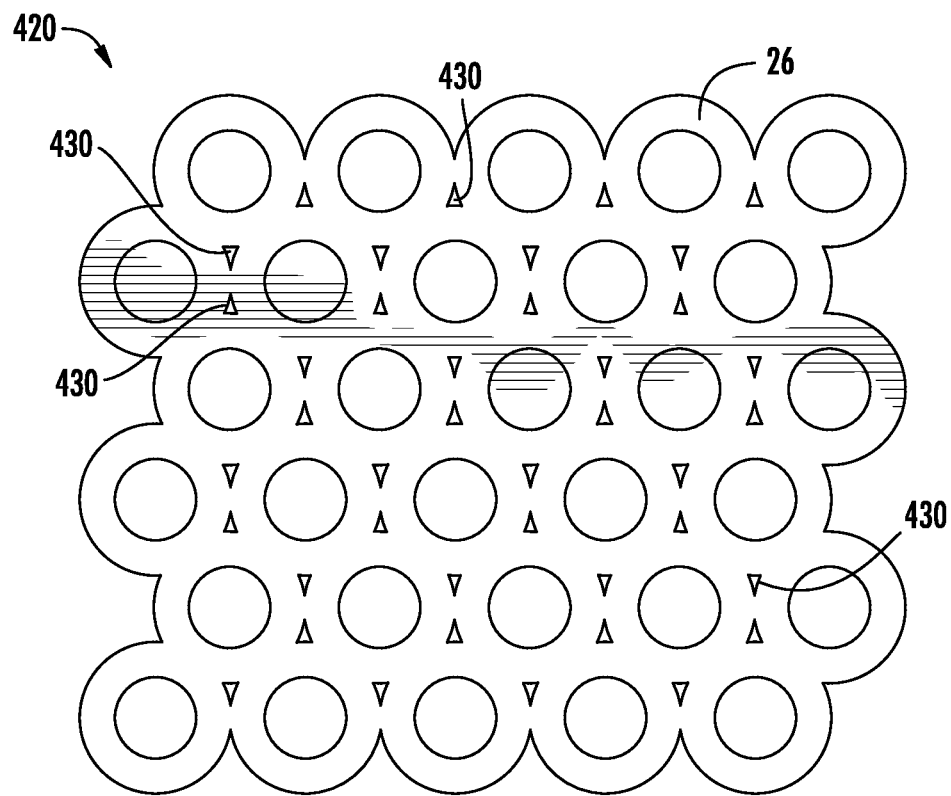
FIG. 10 is a sectional view of another example microporous structure.

FIG. 10 is a sectional view through another example microporous structure 420 illustrating how the thickness of the coatings forming coating 26 may be adjusted to further selectively control the size and density of pores in a microporous structure. Microporous structure 420 is similar microporous structure 320 with the same location and spacing of nano wires 24, but wherein the thickness of the coating about each of nano wires 24 forming coating 26 is increased such that the adjacent coatings of adjacent nano wires merge or coalesce to fill in more of the spaces between consecutive nano wires 24. As a result, microporous structure 420 has smaller pores 430. By adjustably controlling the thickness of the coating applied about each of nano wires 24, the size of pores 430 may be precisely controlled for selected filtering performance.

Figure 11:
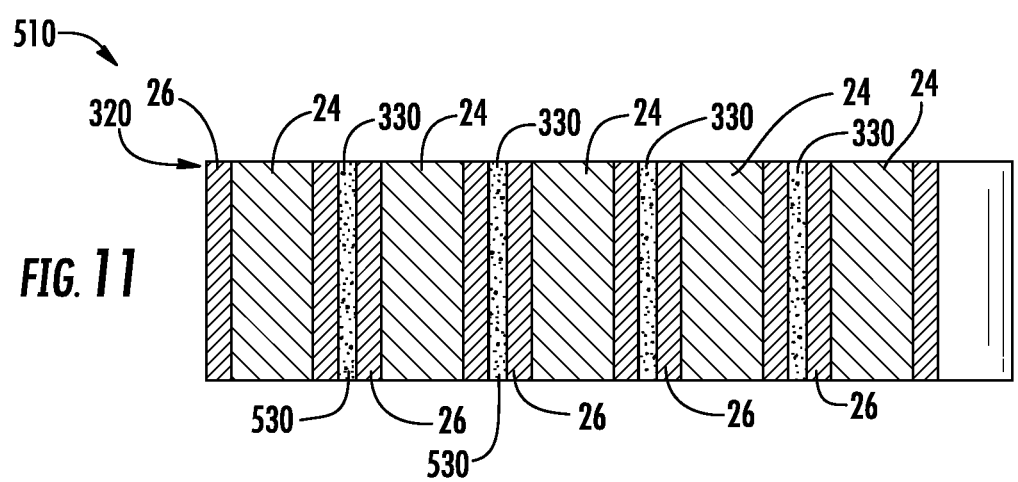
FIG. 11 is a sectional view of an example supported liquid membrane comprising the example microporous structure of FIG. 2.

FIG. 11 is a sectional view of an example supported liquid membrane 510. Support liquid membrane 510 is used for the extraction, separation and removal of gases, ions or molecules via permeation and transport processes. Supported liquid membrane 510 comprises microporous structure 320 and organic phase 530. Microporous structure 320, described above, serves as an inert microporous support for immobilizing organic phase 530 (schematically represented by stippling). The pores 330 of microporous structure 320 are impregnated with organic phase 530. Microporous structure 320 is hydrophobic so as to retain organic phase 530 within pores 330 by capillary action.

Organic phase 530 at least partially fills and is retained within pores 330. Organic phase 530 comprises an extractant and a diluent. The extractant comprises an organic solvent, sometimes with dissolved reagents, chosen based on what gases, ions or molecules are to be extracted from a feed liquid on one side of the membrane 510. In terms of the mechanism of extraction, organic phase 530 may comprise extraction by compound formation, and extraction by ion-pair formation or extraction by solvation formation.

The diluent dilutes or adjusts the concentration of the organic extractant. In one implementation, the diluent has a high dielectric constant and a low viscosity. The diluent reduces viscosity of the organic phase 530 to facilitate diffusivity within microporous structure 320.

Figure 12:
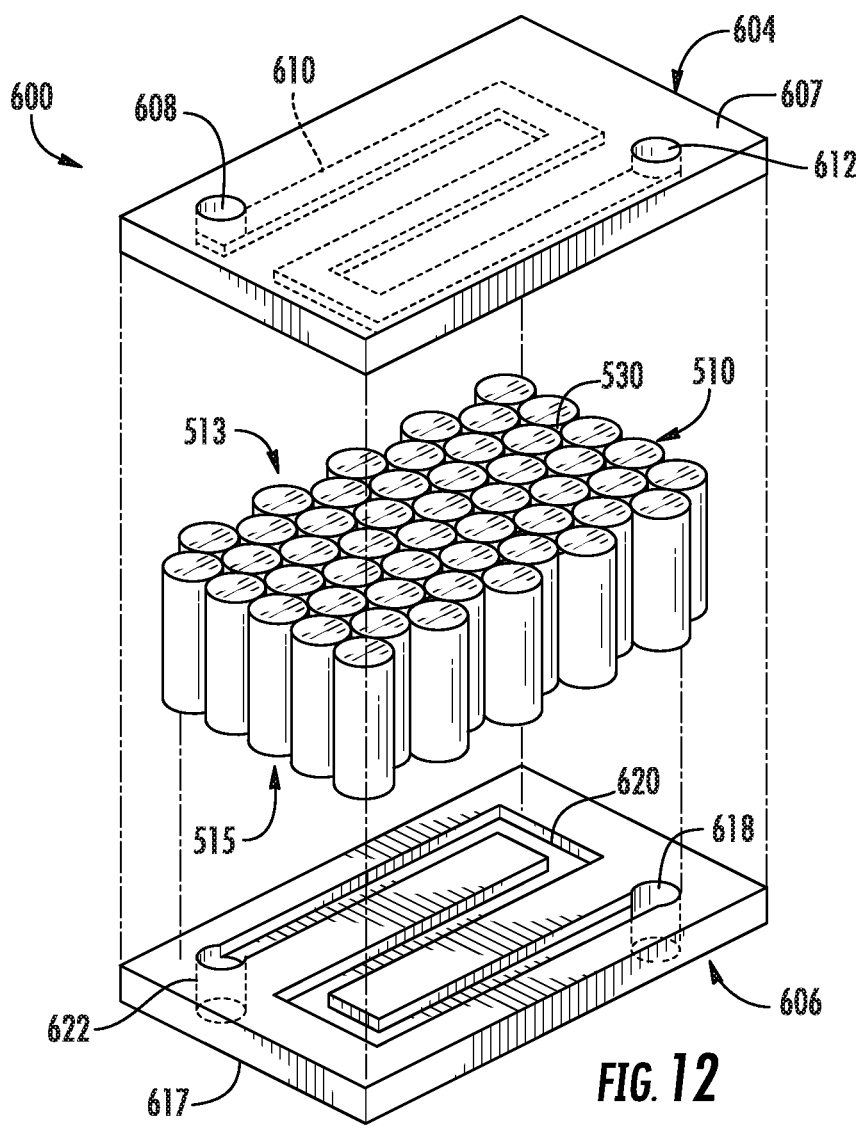
FIG. 12 is an exploded perspective view of an example extraction system comprising the example supported liquid membrane of FIG. 11.
Figure 13:
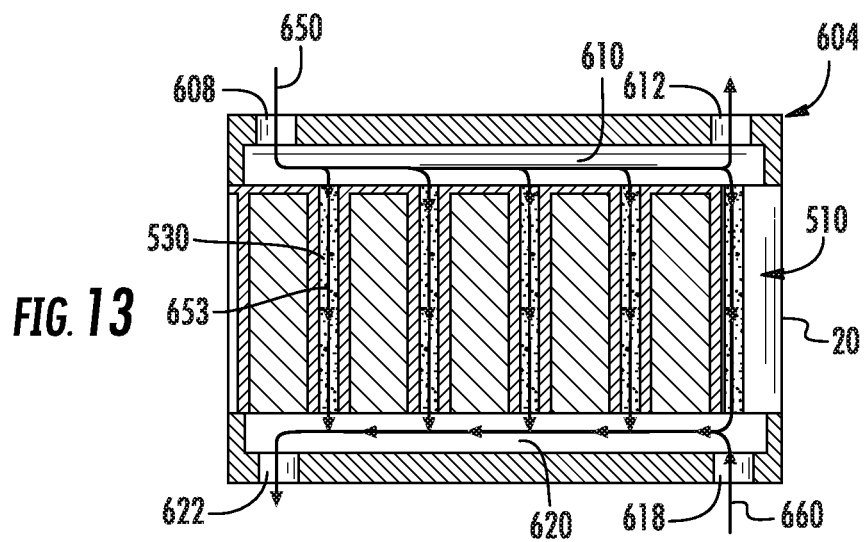
FIG. 13 is a sectional view of the example extraction system of FIG. 12.

FIGS. 12 and 13 illustrate an example extraction system 600 for separating and extracting gases, ions or molecules are to be extracted from a feed liquid. Extraction system 600 comprises liquid supported membrane 510 sandwiched between donor supply 604 and acceptor 606. Donor supply 604 provides a sample or feed liquid to one side of liquid supported membrane 510. In the example illustrated, donor supply 604 comprises a panel 607 having inlet 608, microfluidic channel 610 and outlet 612. Inlet 608 is connected to a source of a sample or feed liquid containing the gases, ions or molecules to be extracted and separated out.

Channel 610 extends from inlet 608 to outlet 612. Channel 610 has an open underside, allowing the feed liquid to flow across a top face of liquid supported membrane 510, across pores 330 and the organic phase 530 retained therewithin. In the example illustrated, channel 610 is serpentine such that the feed liquid flows across a greater surface area of a top side of membrane 510. In other implementations, channel 610 may have other shaped paths.

Outlet 612 extends from channel 510. Feed liquid that is been guided across top face 513 of liquid supported membrane 510 exits the channel 610 through outlet 612. In one implementation, the feed liquid exiting through outlet 612 is recirculated back to inlet 608. In one implementation, feed liquid exiting through outlet 612 is mixed with other liquid containing the gases, ions or molecules being separated out prior to being recirculated through inlet 608.

Acceptor 606 provides a liquid that receives the separated out and extracted gases, ions or molecules to facilitate transport of the extracted gases, ions or molecules to a target destination. In the example illustrated, acceptor 606 comprises a panel 617 having inlet 618, microfluidic channel 620 and outlet 622. Inlet 618 is connected to a source of an acceptor liquid to receive and transport the gases, ions or molecules that is been extracted are separated out by the organic phase 530 within pores 330 of liquid supported membrane 510.

Channel 620 extends from inlet 618 to outlet 622. Channel 620 has an open top side, allowing the acceptor liquid to flow across a bottom face of liquid supported membrane 510, across pores 330 and the organic phase 530 retained therewithin. In the example illustrated, channel 620 is serpentine such that the acceptor liquid flows across a greater surface area of the bottom side of membrane 510. In other implementations, channel 620 may have other shaped paths.

Outlet 622 extends from channel 520. Acceptor liquid that is been guided across bottom face 515 of liquid supported membrane 510 exits the channel 620 through outlet 622. In one implementation, the acceptor liquid exiting through outlet 622 is recirculated back to inlet 618 to facilitate the receipt of additional gases, molecules or ions to increase the concentration of such gases, molecules and/or ions in the acceptor liquid. In one implementation, upon obtaining a desired concentration of the targeted gases, molecules and/or ions extracted, the acceptor liquid may be redirected to a separate volume or storage facility brother target destination to facilitate use of the extracted gases, molecules and/or ions.

FIG. 13 illustrates operation of extraction system 600. As shown by FIG. 13, a feed liquid 650 is supplied through inlet 608 and flows long channel 610 until being discharged through outlet 612. As the feed liquid 650 flows across the top face 513 of liquid supported membrane 510, the targeted gases, molecules or ions in the feed liquid diffuse or are transported across organic phase 530 within pores 330 as indicated by arrows 653.

As the feed liquid 650 is flowing through channel 600 and the targeted gases, molecules or lines are being diffused through organic phase 530, acceptor liquid 660 is being directed through inlet 618, across channel 620 and to outlet 622. The targeted gases, molecules or ions exit pores 330 into the acceptor liquid 660 flowing within channel 620. Thereafter, the acceptor liquid, containing the received targeted gases, molecules or ions, exits outlet 622. In one implementation, the acceptor liquid exiting outlet 622 is redirected back to inlet 618 for the reception of additional target gases, molecules or ions. In one implementation, the acceptor liquid exiting outlet 622 is selectively directed to a target destination such as a destination where the extracted gases, molecules and/or ions are analyzed. Although feed liquid 650 and acceptor liquid 660 are illustrated as flowing and generally opposite directions through channels 610 and 620, respectively, in other implementations, feed liquid 650 and acceptor liquid 660 may alternatively flow into the same directions.

Figure 14:
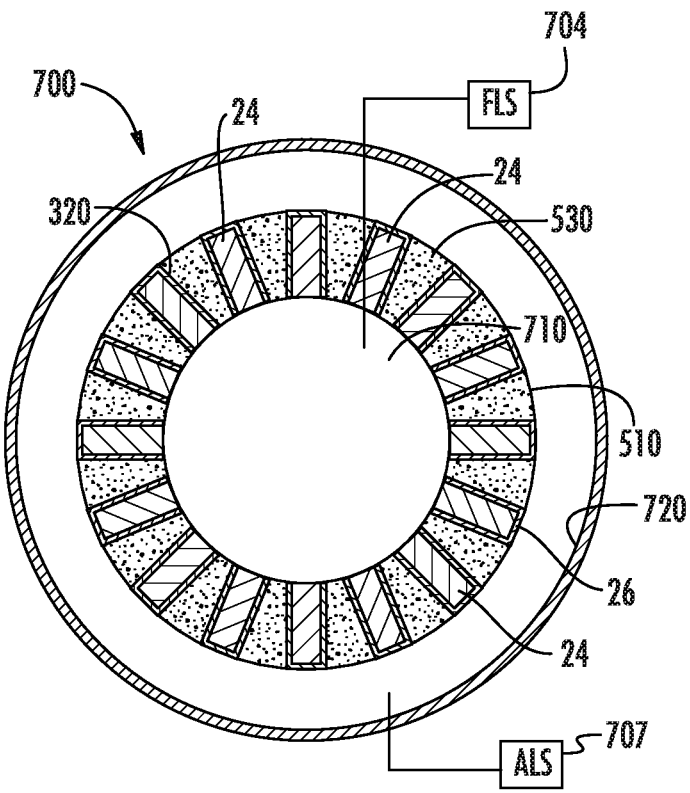
FIG. 14 is a sectional view of another example extraction system comprising the example supported liquid membrane of FIG. 11.
Figure 15:
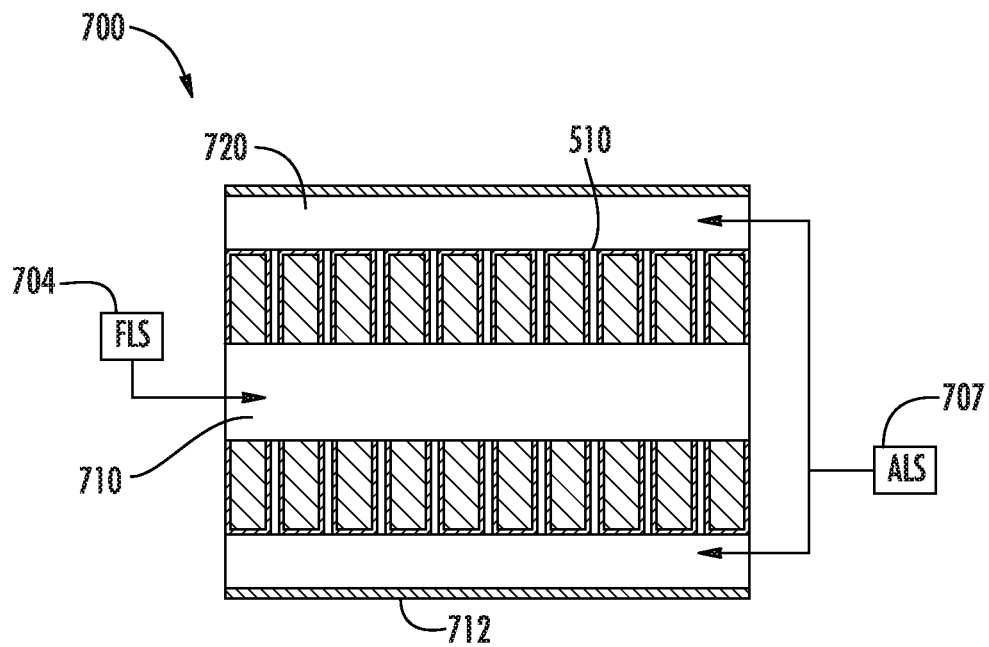
FIG. 15 is a sectional view of the example extraction system of FIG. 14.

Although microporous structure 320, liquid supported membrane 510 and extraction system 600 are illustrated as part of or utilizing a flat sheet imported liquid membrane, in other implementations, microporous structure 320, liquid supported membrane 510 and extraction system 600 may alternatively be part of or utilize a hollow tubular or cylindrical supported liquid membrane, wherein the feed liquid and the acceptor liquid flow through and along concentric rings or paths. FIGS. 14 and 15 illustrate another example extraction system 700, wherein the supported liquid membrane 510 is arcuately bent and retained in a hollow tubular shape, wherein a fluid liquid supply 704 supplies the feed liquid through an innermost conduit passage 710 within membrane 510 and wherein the acceptor liquid is supplied through a second outer conduit or passage 720 and acceptor liquid source 707. In the example illustrated, microporous structure 320, formed according to the method shown in FIGS. 4, 5A and 5B is bent and retained in a tubular shape and is positioned within an outer sheath 712.

Figure 16:
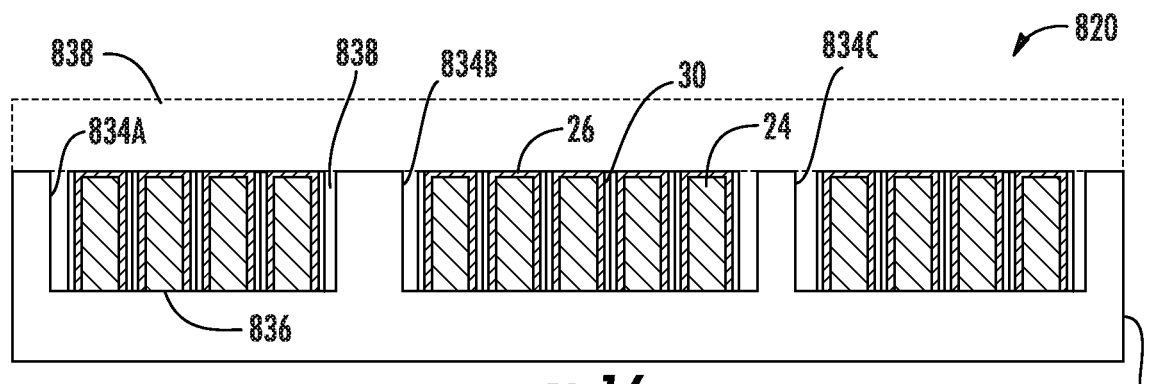
FIG. 16 is a sectional view of another example microporous structure.
Figure 17:
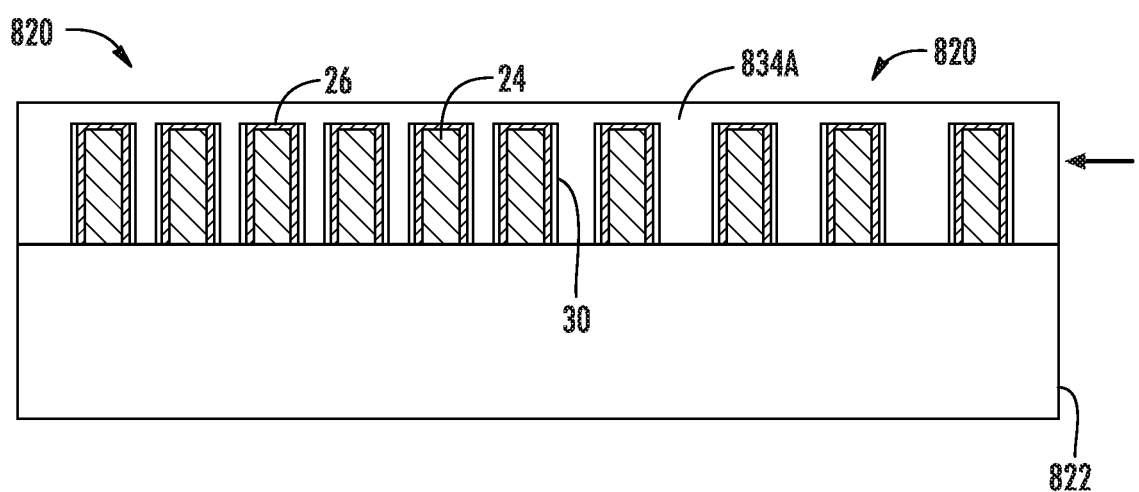
FIG. 17 is a sectional view of the example microporous structure of FIG. 16.

FIGS. 16 and 17 are sectional views illustrating microporous structure 820, another example microporous structure 20. As with microporous structure 20, microporous structure 820 comprises an array of nano wires joined to one another and a coating about the nano wires, wherein the coating controls, regulates or defines pores between the nano wires. With microporous structure 820, the nano wires are joined to one another, not by the coating, but by the underlying substrate. In one implementation, the underlying substrate is imperforate or impermeable, wherein the fluid being filtered is directed parallel to and across the substrate through the pores.

As shown by FIGS. 16 and 17, microporous structure 820 comprises substrate 822, nano wires 24 and coating 26 which defines open spaces, gaps or pores 30. Substrate 822 serves as a foundation upon which nano wires 24 are formed. Substrate 822 joins nano wires 24 along their bottoms or lower portions such that nano wires 24 are retained in place relative to one another as a single unit. In the example illustrated, substrate 822 comprises channels 834A, 834B and 834C (collectively referred to as channels 834. Each of channels 834 has a floor 836 and sidewalls 838. Channels 834 serve to guide the flow of fluid parallel to and across floor 836 between sidewalls 838.

In other implementations, substrate 822 may alternatively omit channels 834, wherein the cover is secured to substrate 822 and wherein the cover or dome as projecting walls that contact and connect with the top surface of substrate 822 to cooperate with substrate 822 to form channels containing the coated nano wires 24. In implementations where a dome or cover if provided, such as cover 838 (shown in broken lines), microporous structure 822 may be in a vertical orientation (nano wires 24 extending in a sideways or horizontal direction) such that fluid flows vertically through channels 834, substantially perpendicular to the centerlines of nano wires 24. In some implementations, an organic phase may be retained within pores 30, wherein targeted ions, molecules or gases are diffused through the organic phase.

Nano wires 24, coating 26 and pores 30 are described above. In the example illustrated, nano wires 26 are formed upon the floor 836 of each of channels 834. Coating 26 extends about and over each of nano wires 24, but does not contact coatings of adjacent nano wires 24, leaving gaps or pores 30 between the coating 26 upon the adjacent nano wires 24. In one implementation, the nano wires 24 within the different channels 834 are differently coated, cover with coatings of different thicknesses, such that the pores within the different channels 834 are differently sized or have different densities. In other words, due to different coating thicknesses in the different channels 834, the density or size of the pores 30 within channel 834A may be different than the density or the size of the pores within channel 834B and 834C. As a result, microporous structure 820 may provide different filtering characteristics depending upon through which channel 834 fluid is directed.

Figure 18:
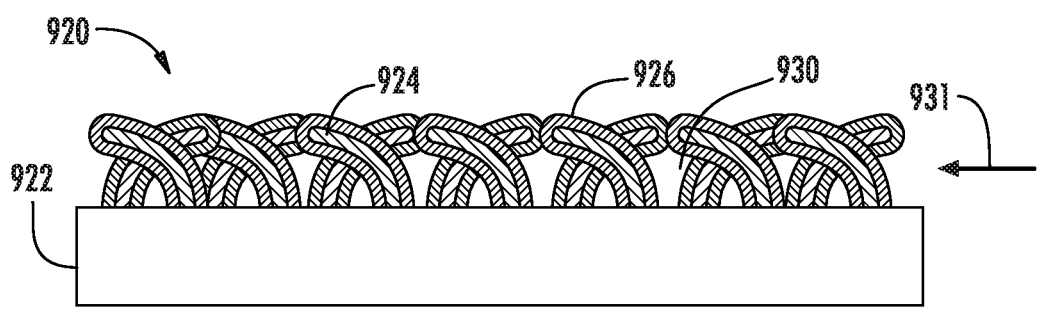
FIG. 18 is a sectional view of another example microporous structure.

FIG. 18 is a sectional view illustrating microporous structure 920, another implementation of microporous structure 20. As with each of the above disclosed microporous structures, microporous structure 920 comprises an array of nano wires joined to one another and a coating about the nano wires, wherein the coating controls, regulates or defines pores between the nano wires. Microporous structure 920 comprises substrate 922, nano wires 924 and coating 926 which form pores 930. Substrate 922 comprises foundation upon which nano wires 924 are formed. In the example illustrated, substrate 922 is imperfect or impermeable, wherein the fluid being filtered or the extraction of the analyte occurs in a direction 931 substantially parallel to substrate 922. In the example illustrated, substrate 922 has a generally flat profile having an upper surface from which nano wires 924 extend. In another implementation, substrate 922 may comprise channels 834 (shown and described with respect to FIGS. 16 and 17), wherein nano wires 24 extend from the floor of such channels.

Nano wires 924 and coating 926 are similar to nano wires 24 and coating 26 described above except that nano wires 924 are angled or bent. In the example illustrated, nano wires 924 are sufficiently bent such that portions of one nano wire 924 extend over and above (or overlap) portions of another nano wire 924. In one implementation, nano wires 924 may mesh with one another. In one implementation, the bending or meshing of nano wires 924 is formed by amorphous nano wire growth or by collapsing the nano wires 924, that comprise high aspect ratio pillars, into a random or designed pattern using elasto-capillary forces (i.e. exposing the pillars to an evaporating fluid). In one implementation, coating 926 is applied to nano wires 924 while the nano wires 924 are in a bent state. In one implementation, the coatings of adjacent overlapping nano wires fuse together, holding or retaining the nano wires around 924 in their bent states. In other implementations, nano wires 924 are joined solely by substrate 922, wherein adjacent coated nano wires 924 are not stuck together. In such an implementation, the high aspect ratio of the coated nano wires 924 serves to retain nano wires 94 in their bent states.

Figure 19:
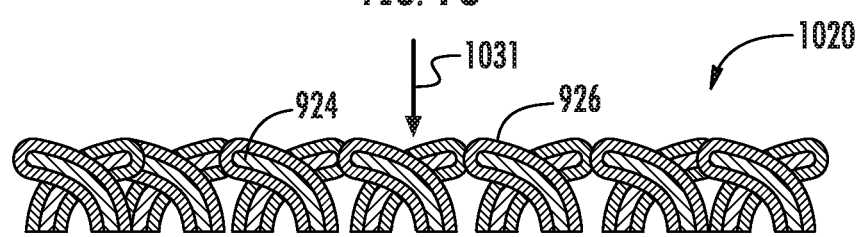
FIG. 19 is a sectional view of another example microporous structure.

FIG. 19 illustrates microporous structure 1020, another implementation of microporous structure 20. Microporous structure 1020 is similar to microporous structure 920 except that microporous structure 1020 is coated such that the coatings of overlapping, bent nano wires 924 contact one another and are fused or adhered to one another such that coating 926 on the overlapping portions of the nano wires 924 join the individual nano wires 924 as a single body or unit, allowing the substrate 922 (shown FIG. 18) to be separated from the coated nano wires after the nano wires 924 have been formed upon substrate 922 and after coating 926 has been applied to the bent nano wires 924. Because microporous structure 1020 omits substrate 922, the filtering of fluid or the extraction of analytes may occur in a direction 1031 that is perpendicular to the surface upon which nano wires 924 originally extended, perpendicular to the two major dimensions of microporous structure 1020.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
a two-dimensional array of columnar nano wires;
a substrate from which each of the columnar nano wires project; and
a coating about the columnar nano wires, the coating defining pores between the columnar nano wires to form a microporous structure,
wherein the substrate comprises:
a first channel containing the two-dimensional array of columnar nano wires, the columnar nano wires of two-dimensional array are perpendicular to the substrate, and each of the columnar nano wires projecting from a floor of the first channel; and wherein the apparatus further comprises:
a second channel formed in the substrate and having a second floor; and
a second two-dimensional array of columnar nano wires, the columnar nano wires of the second two-dimensional array are perpendicular to the substrate, and each of the columnar nano wires of the second two-dimensional array projecting from the second floor the second channel; and
a second coating about the columnar nano wires of the second two-dimensional array, the second coating defining second pores between the columnar nano wires of the second two-dimensional array to form a second microporous structure,
wherein the coating about the columnar nano wires of the two-dimensional array has a first thickness and
wherein the second coating about the columnar nano wire of the second two-dimensional array has a second thickness greater than the first thickness.

2. The apparatus of claim 1 further comprising an organic phase supported within the pores to form a supported liquid membrane.

3. The apparatus of claim 1 wherein the substrate holds the columnar nano wires of the first and/or second two-dimensional array in place relative to one another.

4. The apparatus of claim 1, wherein the coating joins the columnar nano wires of first and/or second two-dimensional array.

5. The apparatus of claim 1, wherein the columnar nano wires of first and/or second two-dimensional array have bent portions that are.

6. The apparatus of claim 1, wherein the microporous structure has a thickness corresponding to a height of the columnar nano wires.

7. The apparatus of claim 1 wherein each of the columnar nano wires of the first and/or second two-dimensional array has a first end in contact with the substrate and a second end free of the substrate.

8. A method comprising:
forming an array of nano wires upon a substrate comprising a first channel and a second channel;
coating a first plurality of the nano wires of the array within the first channel with a first thickness of a coating to form a first plurality of pores between the first plurality of nano wires,
wherein the first plurality of nano wires is projected from a floor of the first channel and perpendicular to the substrate; and
coating a second plurality of the nano wires of the array within the second channel with a second thickness of the coating to form a second plurality of pores between the second plurality of nano wires,
wherein the second plurality of nano wires is projected from a second floor of the second channel and perpendicular to the substrate, and
wherein the second thickness is greater than the first thickness.

9. The method of claim 8, wherein the nano wires are coated such that coatings of different nano wires interconnect the different nano wires.

10. The method of claim 8, further comprising controlling a density of the array of nano wires upon the substrate to control a density of the first plurality of pores and the second plurality of pores of the microporous structure.

11. The method of claim 8, further comprising controlling a density of the array of nano wires upon the substrate to control a size of the first plurality of pores and the second plurality of pores of the microporous structure.

12. The method of claim 8 further comprising filling the first plurality of pores and the second plurality of pores with an active phase to form a supported liquid membrane.

13. The method of claim 8, wherein the coating is applied while the nano wires are in a bent state.

14. The method of claim 8, wherein the forming of the array of nano wires comprises nano imprinting the nano wires.

15. The method of claim 8, wherein the array of nano wires formed upon the substrate is formed in a first and second two-dimensional array of columnar nano wires.

* * * * *